No. 638,571. Patented Dec. 5, 1899.
J. FOSTER.
APPARATUS FOR CONCENTRATING CRUDE GLYCERIN SOLUTIONS.
(Application filed May 22, 1899.)

(No Model.) 2 Sheets—Sheet 1.

WITNESSES
Richard A. Wright
J. C. Connor

INVENTOR
James Foster
by his attorneys
Howson and Howson

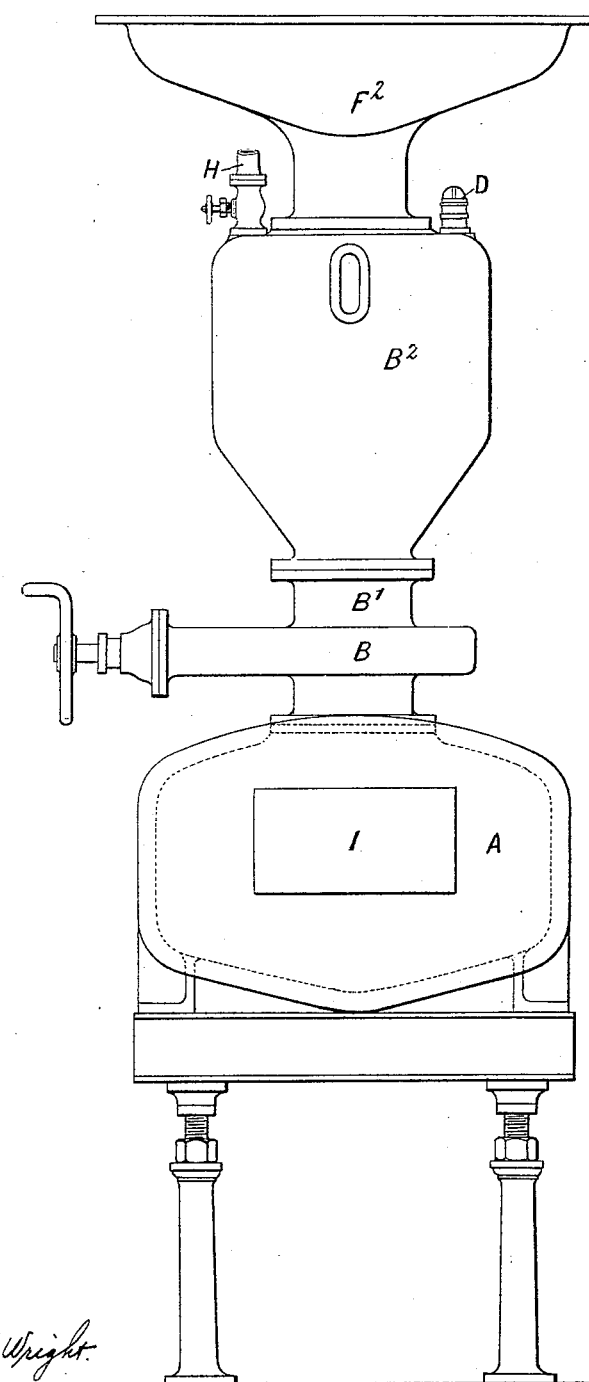

UNITED STATES PATENT OFFICE.

JAMES FOSTER, OF GLASGOW, SCOTLAND.

APPARATUS FOR CONCENTRATING CRUDE GLYCERIN SOLUTIONS.

SPECIFICATION forming part of Letters Patent No. 638,571, dated December 5, 1899.

Application filed May 22, 1899. Serial No. 717,820. (No model.)

*To all whom it may concern:*

Be it known that I, JAMES FOSTER, a subject of the Queen of Great Britain and Ireland, and a resident of Pollokshields, Glasgow, Scotland, have invented certain new and useful Improvements in Concentrating Apparatus, of which the following is a specification.

This invention has reference to improved apparatus for concentrating and recovering crude glycerin from soap-makers' spent lyes and extracting and recovering the salt from same during concentration by single or multiple effect apparatus working under vacuum.

The improvements comprise improved combinations of evaporating plant and drawing-off valves and filtering and drying appliances.

In order that others skilled in the art to which my improvements relate may understand how same may be carried into practice, I have hereunto appended two sheets of explanatory drawings, in which—

Figure 2:
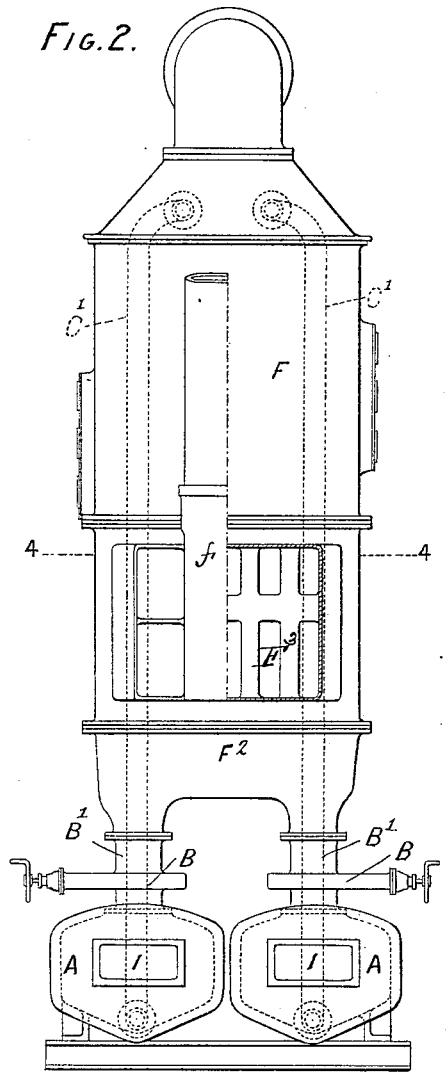
Figure 1:
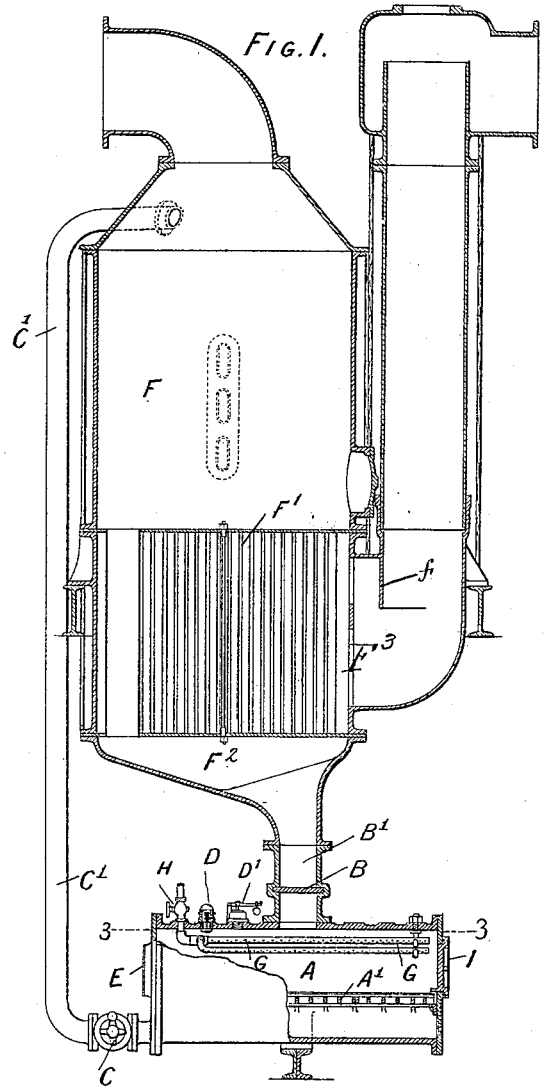
Figure 4:
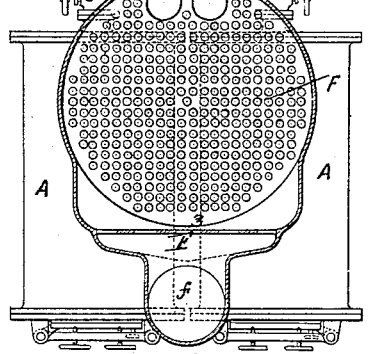
Figure 3:
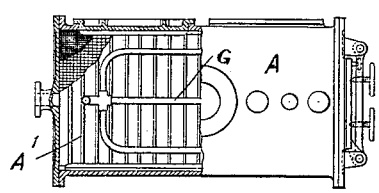

Figure 1 represents a sectional side elevation, and Fig. 2 an end view, of concentrating apparatus as constructed in accordance with my improvements, while Figs. 3 and 4 are horizontal sections as taken on the lines 3 3 and 4 4, respectively, of Figs. 1 and 2; and Fig. 5 is an end view showing the hopper arrangement.

Referring to the drawings, the evaporating vessel F, into which the lyes to be treated are supplied, is fitted with a steam-drum F', in which are tubes for the liquor to circulate through, and the bottom cover $F^2$ of the evaporator is formed of a downwardly-sloping angular shape toward one side, so that the salts which are precipitated are swept down into the filter A by the rapid circulation of the liquor under treatment. Ports $F^3$ are formed on the heating-chamber of the evaporator, and the vapor-supply pipe $f$ is carried down to about the center level of the heating-chamber, by which a most perfect distribution of the vapor and circulation of the liquor under treatment is obtained.

A valve-chest B' is fitted with a valve B and is located between the bottom cover $F^2$ of evaporator and the filtering vessel A, and two of these are preferably used in connection with each evaporating vessel, so that the one is alternately shut off while the other is working. This filter vessel A is fitted with a sight-glass E at its one end to see when the filter is full of salt and with a door I at its other end for removing the dry filtered salt. A steam-valve H is fitted for admitting steam to the perforated tube G, and an air-valve D and safety-valve D' are also fitted on top, while a cock C is fitted from whence a pipe connection C' would be taken to the upper vacuum-space of evaporator F. The filter is fitted with a filter-bed A' of iron netting and copper gauze and an iron grid-plate.

The action of these appliances is as follows: In working these salt-filters when the apparatus is started to work the valve B at the bottom of the vessel connected to the salt-filter is opened (and that in the other filter shuts) and during the concentration of the liquor the salt that is formed is precipitated into the salt-filter A and when full with salt, which can be seen in the sight-glasses E, the valve B is shut, (and the valve B on the other salt-filter is opened,) and cock C on the pipe C' is then opened to the vacuum-space in top chamber F, and the steam-cock H is opened at the same time as cock C. The steam from cock H passes through the perforated pipes G and drives the liquor through the salt, the liquor and steam being sucked through cock C up into the top chamber F by the vacuum. When the salt is thoroughly dried, which can be seen in the sight-glasses E, cocks H and C are shut and the air-valve D opened, and door I is opened for taking out the dry salt. After the salt is taken out the door I is closed and cock H opened, and when the steam has blown all the air out of the salt-filter through cock D both cocks H and D are shut and valve B is opened, gently at first, to allow the steam in the salt-filter to pass quietly into the apparatus, and after the steam has all passed and the liquor is seen to rise in the sight-glasses E valve B is opened full. These salt-filters are worked alternately. In small apparatus only one salt-filter is used, there being placed between the salt-filter A and the bottom cover $F^2$ of the vessel F a salt-hopper $B^2$ (shown in Fig. 5) to receive the salt precipitated during the operation of drying in the salt-filter.

What I claim is—

1. In a concentrating apparatus, the combination with the evaporating vessel, of a filter located below said vessel, a pipe connection between the evaporating vessel and the filter, a valve in said pipe, a perforated pipe extending substantially throughout the length of the filter in the upper part thereof and adapted to be connected to a source of steam-supply, a valve in said pipe for controlling the supply of steam, and pipe connections between the filter and the vacuum-space of the evaporating vessel, substantially as described.

2. In a concentrating apparatus, the combination with the evaporating vessel provided with a heating device, and ports in the lower part thereof, a vapor-supply pipe opening into the same below the horizontal central line of the heating device, a filter located below said evaporating vessel, a valved connection between the evaporating vessel and said filter, a perforated pipe extending substantially throughout the length of the filter in the upper part thereof and adapted to be connected to a source of steam-supply, a valve in said pipe for controlling the steam-supply, and pipe connections between the filter and the vacuum-space of the evaporating vessel, substantially as described.

3. In a concentrating apparatus, the combination with the evaporating vessel, of a filter located below the same, a valved connection between the filter and the evaporating vessel, an air-valve in said filter, a perforated pipe extending substantially throughout the length of the filter in the upper part thereof and adapted to be connected to a source of steam-supply, a valve in said pipe for controlling the steam-supply, and pipe connections between the filter and the vacuum-space of the evaporating vessel, substantially as described.

In testimony whereof I have signed my name to this specification in the presence of two subscribing witnesses.

JAMES FOSTER.

Witnesses:
R. C. THOMSON,
WM. RUTHERFORD.